US 6,728,553 B1

(12) United States Patent
Lehmus et al.

(10) Patent No.: US 6,728,553 B1
(45) Date of Patent: Apr. 27, 2004

(54) SUBSCRIBER IDENTITY MODULE MOBILE STATION AND METHOD FOR PERFORMING A SMART CARD FUNCTION

(75) Inventors: Marja-Leena Lehmus, Espoo (FI); Salla Oksman, Helsinki (FI); Susanna Eskola, Helsinki (FI); Janne Linkola, Helsinki (FI)

(73) Assignee: Sonera Oy, Helsinki (FI)

( * ) Notice: Subject to any disclaimer, the term of this patent is extended or adjusted under 35 U.S.C. 154(b) by 0 days.

(21) Appl. No.: 09/362,175

(22) Filed: Jul. 27, 1999

(30) Foreign Application Priority Data

Jan. 27, 1997 (FI) .................................................. 970339
Jan. 27, 1998 (WO) ................... PCT/FI98/00080

(51) Int. Cl.[7] ............................. H04B 1/38; H04M 1/00
(52) U.S. Cl. ..................... 455/558; 455/557; 455/556.1
(58) Field of Search ................................. 455/550, 556, 455/557, 558, 575, 90, 466, 556.1, 550.1, 344, 90.3, 575.1, 575.4, 517, 410, 411, 412.1, 414.1; 379/433.09; 235/492, 441, 451, 380

(56) References Cited

U.S. PATENT DOCUMENTS

| | | | | |
|---|---|---|---|---|
| 5,353,328 A | * | 10/1994 | Jokimies ...................... 455/558 |
| 5,485,505 A | * | 1/1996 | Norman et al. ............... 455/419 |
| 5,887,266 A | * | 3/1999 | Heinonen et al. ............ 455/558 |
| 5,915,225 A | * | 6/1999 | Mills ........................... 455/558 |
| 6,012,634 A | * | 1/2000 | Brogan et al. ............... 235/380 |
| 6,085,099 A | * | 7/2000 | Ritter et al. ................. 455/466 |

FOREIGN PATENT DOCUMENTS

| | | |
|---|---|---|
| DE | 19607509 A1 | 9/1996 |
| EP | 0 739 149 A2 | 10/1996 |
| FR | 2 740 291 | 4/1997 |
| WO | WO 94/11849 | 11/1993 |
| WO | WO 96/13814 | 5/1996 |
| WO | WO 96/32700 | 10/1996 |
| WO | WO 97/41499 | 11/1997 |
| WO | WO 97/44762 | 11/1997 |

* cited by examiner

Primary Examiner—Erika Gary
Assistant Examiner—Eliseo Ramos-Feliciano
(74) Attorney, Agent, or Firm—Cohen, Pontani, Lieberman & Pavane

(57) ABSTRACT

A subscriber identity module makes it possible to integrate different smart card functions with the SIM card used in a mobile station. The invention enables new diversified service combinations to be implemented so as to allow them to be utilized via a data communication device, such as a mobile station. A feature characteristic of these service combinations is that a part of the series of actions is carried out in a system and/or application external to the data communication system and the data communication device in addition to or instead of wireless communication between the mobile station and the data communication system/application.

13 Claims, 2 Drawing Sheets

SUBSCRIBER IDENTITY MODULE MOBILE STATION AND METHOD FOR PERFORMING A SMART CARD FUNCTION

BACKGROUND OF THE INVENTION

1. Field of the Invention

The present invention relates to a subscriber identity module for a mobile communication station, and a method of utilizing a subscriber identity module in a mobile communication station.

2. Description of the Related Art

In the prior art, a subscriber identity module is known that comprises a memory device, a data processing device connected to it and an interface for connection to a mobile station. Further, in a known method of communication between a subscriber identity module and a mobile station, the mobile station initiates the connection. The subscriber identity module as known at present cannot initiate communication with the mobile station. An example of such a system is the GSM system (GSM, Global System for Mobile Communications). Moreover, a subscriber identity module card is known in which a single physical card may contain several independent subscriber identity modules. An example of such a system is a SIM card (SIM subscriber-identification module) used in the GSM system that has two processors on opposite sides of the card. In the GSM mobile telephone network, the SIM card is a component which, in addition to the subscriber's international telephone number, also contains other stored user-specific and network-specific data, such as the user's coded speed dialing numbers, a password to prevent misuse, and international codes of interconnected systems. A priority level for congestion situations can also be defined for the card. With the double SIM card described above, the user gets two separate subscriber connections, i.e. the user may make private calls at his/her own cost and on-duty calls at the cost of his/her employer. A circumstance characteristic of such a solution is that the two processors on the card are unable to communicate between themselves. In other words, the solution described above basically corresponds to a situation where two SIM cards are disposed on the same carrier.

On the other hand, a smart card is known whose structure mainly corresponds to the above—described subscriber identity module. A smart card is generally used, e.g., as an access card, a key or as a bank card. In prior art, many different types of physical interface between the smart card and the external world are known. The card may be, e.g., in galvanic contact with the external world. There may also be a wireless connection between the card and the external world. In this case, both the card and the card reader are provided with coils, between which both information and power needed for the functions of the card are transferred. Therefore, the card can communicate with the external world at radio frequencies without a physical contact with a reader device. Examples of this type of cards are the remote-read cards used, e.g., in buses.

It is also known in the prior art that the subscriber identity module, or SIM, may communicate with a mobile station and a physical transmission network over a standardized interface. The data on the SIM card can be changed via the air interface by transferring information to the card using short messages, e.g. SMS and USSD messages (SMS, Short Message Service; USSD, Unstructured Supplementary Service Data). It is also possible to use a telecommunication terminal to change the data on the SIM card.

Further, many prior-art systems requiring user identification are based on a card identifying the user. Such systems include, e.g., access control systems. Cards identifying the user are also used in various transactions in which the card indicates that a payment has been remitted beforehand or registers the transaction as a credit transaction. Examples of such systems are remote-read bus tickets and credit cards issued by banks. In such systems, the updating of the cards is always done either by physically recharging the card with additional rights using a charger or by replacing an outdated disposable card with a new one. Another alternative is to update the reader, but this is only possible in the case of a limited number of users.

A problem with these systems is that the user must carry several different cards used in different systems. When using different systems, the user always needs a certain card designed for the particular system.

A further problem is that the various actions for updating of the cards, such as recharging the cards with money, changing the validity time, checking credit information and similar actions must always be carried out separately for each card at different points. For example, a money card is recharged at a bank, a credit card is updated on the premises of the commercial enterprise giving the credit, a bus ticket is updated at a kiosk, and so on.

SUMMARY OF THE INVENTION

The object of the present invention is to produce a new type of subscriber identity module that makes it possible to combine several cards used in different systems.

Another object of the invention is to produce a subscriber identity module that makes it possible to unify the use of different cards, in other words, a subscriber identity module that allows the information on cards of different systems to be updated in a centralized manner and almost independently of location by using a mobile station. A further object of the invention is to produce a mobile station that makes it possible to combine the functions of different smart cards and that can be used in more versatile ways and also for purposes other than its conventional function.

A further object of the invention is produce a procedure that allows more diversified functions to be performed using a mobile station.

In short, the object of the invention is to enable new diversified service combinations to be so implemented that they can be utilized via a data communication device, such as a mobile station. A feature characteristic of these service combinations is that a part of the series of actions is carried out in a system and/or application external to the data communication system and the data communication device.

As for the features characteristic of the invention, reference is made to the claims.

The subscriber identity module of the invention comprises a data processing device, which may be a very simple logic circuit or a more complex microprocessor. In addition, the module comprises a memory device connected to the data processing device. The memory device may be any known type of memory, such as ROM, RAM, EPROM or EEPROM. Furthermore, the subscriber identity module of the invention comprises a first data transfer device, which is connected to the data processing device and provided with a first interface for data transfer between a mobile station (MS) and the subscriber identity module. The data transfer device may be, e.g., in galvanic contact with the mobile station.

According to the invention, the subscriber identity module comprises a second data transfer device, which is connected to the data processing device and provided with a second interface, over which a connection for data transmission to a device and/or application other than a mobile station is set up. This other device and/or application may be any external system provided with means for reading and/or writing data over the second interface. The subscriber identity module may also comprise more than two data transfer devices and/or interfaces.

In an embodiment of the present invention, the subscriber identity module comprises a reading and writing device connected to the data processing device via the second data transfer device. This reading and writing device may be a remote device as generally used, e.g., in smart cards in which information and the power needed by the module is transferred via windings or an equivalent medium. On the other hand, the reading and writing device may be an infrared operated device, in which the signaling takes place in the infrared wavelength range.

The invention further relates to a mobile station comprising a subscriber identity module, as described above. The mobile station may preferably comprise a remote device, as described above, connected over an interface to the subscriber identity module. In this case, the subscriber identity module itself may only contain a second data transfer device with a second interface, over which the desired connection to the remote device in the mobile station is set up.

In the procedure of the invention for performing a smart card function using a mobile station as described above, a connection between the subscriber identity module and a first external system is first established. This connection setup initializes the smart card transaction and it comprises an exchange of information relating to the subscriber identity module and the external system. After this, the user is requested to give his/her approval for the execution of the smart card transaction. The request can be presented, e.g., via the display of the mobile station or via a sound signal or a corresponding action. Finally, the first external system is informed of the user's approval. On the other hand, in an embodiment of the invention, in addition to or instead of the user's approval, it is possible to request the approval of a second external system for the execution of the smart card transaction.

In a preferred embodiment of the procedure, predetermined information for the smart card transaction is stored in the subscriber identity module and the information is updated based on the smart card transaction under control of the first system. Such information may relate, e.g., to the recharging of a rechargeable money card, in which the amount of money stored on the card is reduced on the basis of transactions.

The connection to the second external system is preferably established via a mobile communication network. The connection can be set up using short messages, such as SMS and/or USSD messages.

As compared with prior art, the present invention affords the advantage that the subscriber identity module of the invention makes it possible to combine several cards used in different systems. Further, the invention makes it possible to unify the use of different cards included in the subscriber identity module; in other words, it makes it possible to update the information on cards of different systems in a centralized manner and almost independently of location by using a mobile station. In addition, the invention allows various smart card services to be used with a single card. In addition, the invention makes it possible to produce a mobile station by means of which the functions of different smart cards can be used and which can be used in more versatile ways and also for other purposes besides its conventional function. As a further advantage, the procedure of the invention provides a handy way to implement the previously slow and difficult smart card functions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless othrerwise indicated, they are merely intended to conceptually illustrate the structures and procedures described herein.

DETAILED DESCRIPTION OF THE PRESENTLY PREFERRED EMBODIMENTS

Figure 1:
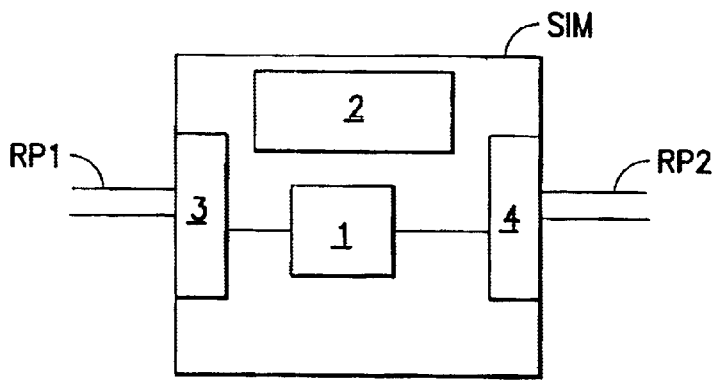
FIG. 1 presents a subscriber identity module according to the invention.

The subscriber identity module SIM presented in FIG. 1 comprises a processor circuit 1 which controls all functions of the module. Moreover, the module comprises a memory circuit 2, which is connected to the processor circuit and contains all the software needed in the module such as the operating system, data transfer protocols for different interfaces, and other programs required. In addition, the module comprises a first data transfer device 3, which includes the functions for the establishment of a first interface RP1 and is used to set up a connection to a mobile station MS. Furthermore, the module comprises a second data transfer device 4, which comprises the functions for the establishment of a second interface RP2 and is used to set up a connection to a second system, e.g. to a remote-read card connected to the subscriber identity module.

The subscriber identity module presented in FIG. 1 also has other preferred embodiments, which are not actually shown in the figure but which are obvious to the skilled person from FIG. 1. One embodiment is a module that contains several processor circuits accessing a common memory area. In this case, one processor takes care of one interface to the external world. In such an arrangement, it is necessary to ensure that when one processor is writing information to the common memory area, the others cannot read it simultaneously from the same memory area. A mechanism of this type is known, e.g., from database solutions.

Another embodiment is a card with a single processor whose capacity is shared between several processes. In this case, one process takes care of data communication over one interface. Such a solution is known, e.g., from the computer world. For example, the UNIX operating system can work with a single processor by utilizing the processor's multitasking capability. This is the way the card would function in this embodiment. A further possibility is to use a hybrid solution comprising more than one processor but having a number of interfaces that is not the same as the number of processors.

Figure 2:
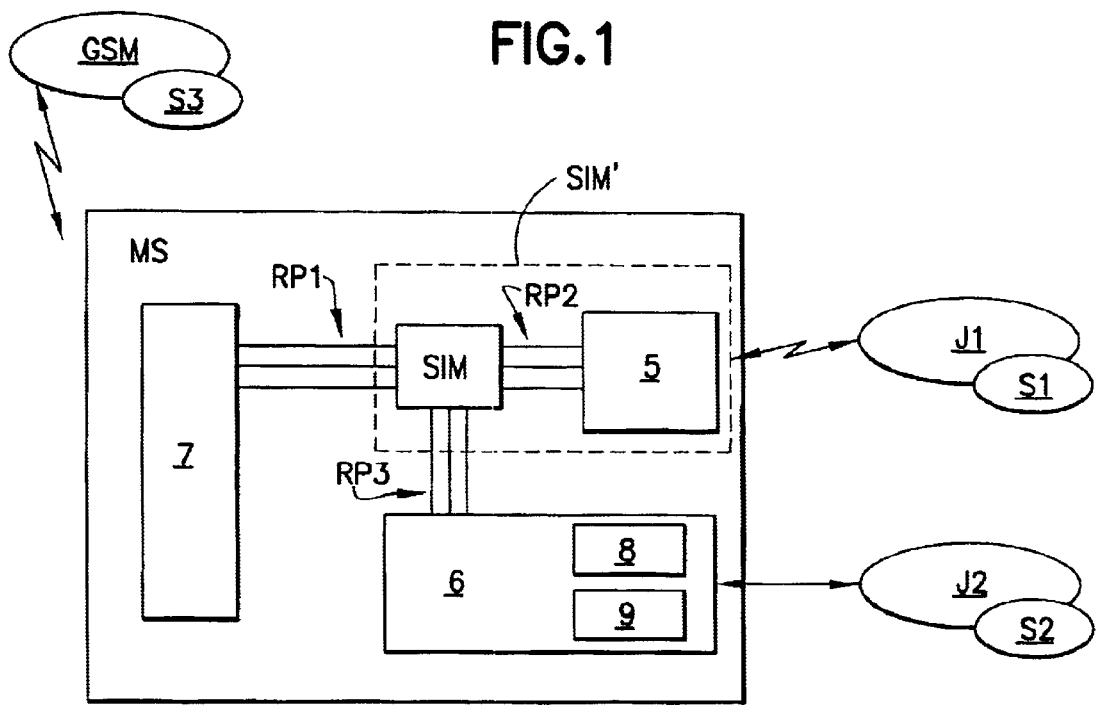
FIG. 2 presents a diagram representing a mobile station according to the invention.

The GSM mobile station MS represented by the diagram in FIG. 2 comprises a SIM' that has been slightly modified from the subscriber identity module SIM in FIG. 1. In addition to a module according to FIG. 1, SIM' comprises a remote-read card 5. The remote-read card 5 is connected via a wireless link to a first system J1, in which a first application S1 is operated. The subscriber identity module SIM is connected to the remote-read card via a second interface RP2. The mobile station MS further comprises an infrared device 6 comprising both an infrared transmitter 8 and an infrared receiver 9. The infrared device can also be used as a bar code reader, and the information read from an application S2 operated in a second system J2 can be transferred over a third interface RP3 into the subscriber identity module for further processing. The mobile station MS further comprises a matching module 7, which is used to establish a connection to the subscriber identity module SIM over the first interface. In addition, as shown in FIG. 2, the mobile station communicates over a wireless connection with a GSM system and an application/applications S3 operated in it.

Figure 3:
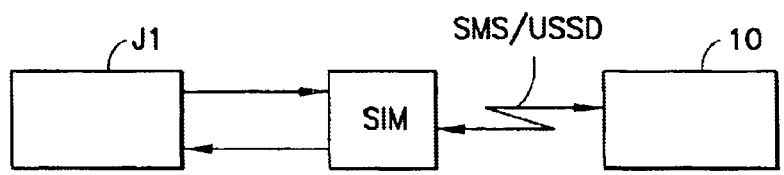
FIG. 3 represents the signaling in a preferred embodiment of the present invention.
Figure 4C:
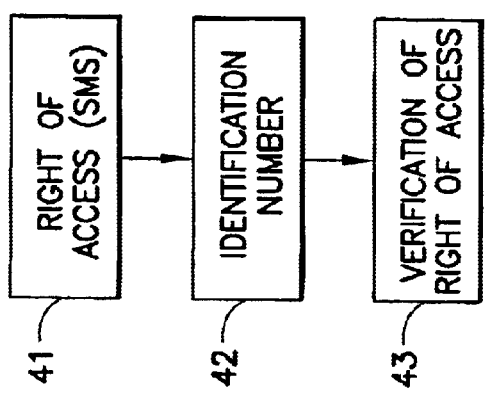
FIGS. 4a–4c are flow diagrams representing certain preferred embodiments of the procedure of the invention.

FIG. 3 represents the signaling between different parts of the assembly in a preferred embodiment of the present invention. This series of actions is also represented by the flow chart in FIG. 4a.

In FIG. 3, the server 10 is a computer comprised in a physical transmission medium, such as a GSM network, and it is capable of communicating in the manner required by the application in the subscriber identity module card. An external system J1, e.g. a remote reader, sends a debiting message, containing information about a sum to be debited, to an application in the subscriber identity module SIM, block 21. The application in the subscriber identity module device SIM recognizes the message as one sent by an external device and forwards it via a physical interface, e.g. a GSM network, as a short message, such as an SM or USSD message to a suitable subscriber 10 in the GSM network. Before forwarding the message, block 22, the application in the subscriber identity module SIM may require an approval of the function from the user. If no approval is obtained, the transaction is terminated, block 23. The message received from the reader J1 must contain an identifier informing the application in the subscriber identity module SIM that a response to the message is expected. The server 10 in turn must contain a program that is able to interpret the messages arriving from the subscriber identity module SIM and respond to them appropriately. An appropriate response may involve, e.g., verification of the creditworthiness of the subscriber identity module that sent the SMS or USSD message, and the granting or turning down of credit. A response indicating granting or rejection of credit is sent to the subscriber identity module in. the form of an SMS or USSD or other short message, which is identified by the module application as a response to a message sent out shortly before, and forwarded to an external reader J1, block 24. The arrival of a response in the reader J1 must be indicated, e.g., by a sound signal. If an affirmative answer is received, the reader J1 responds by printing a receipt for the payment. If the answer is negative, the reader J1 responds by announcing that the payment could not be made, block 25.

An SMS sent by the subscriber identity module SIM must contain a code (e.g. IMSI in the GSM system) identifying the subscriber identity module, the amount debited as well as other information relating to the debiting, such as the date and the place and time of purchase. Moreover, the system must contain encryption and authentication mechanisms.

Figure 4B:
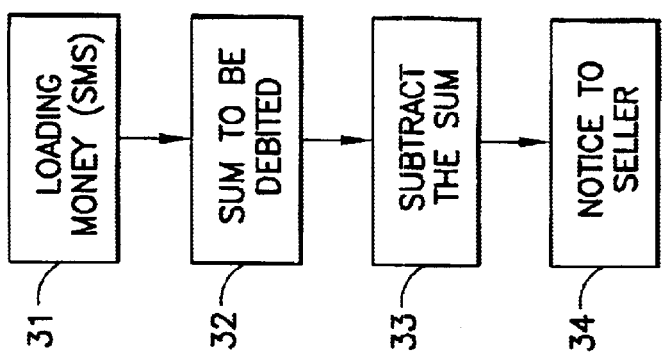
Figure 4A:
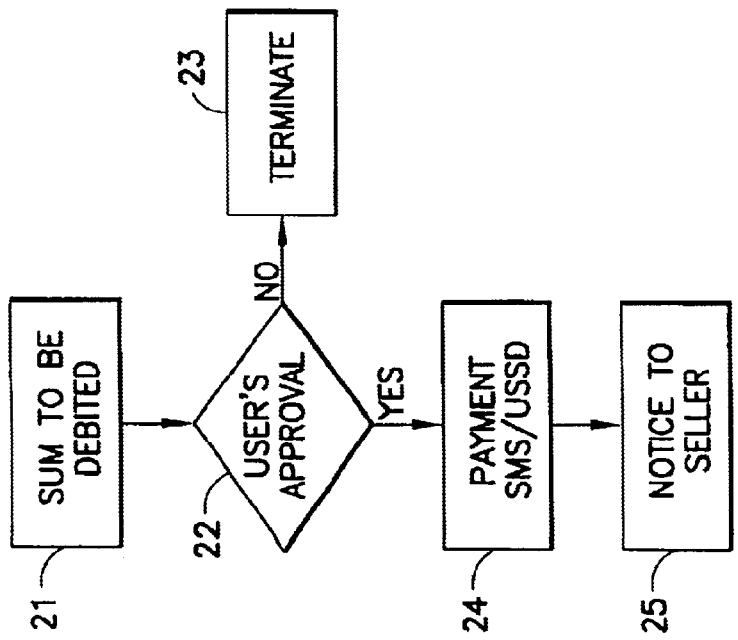

Referring to FIG. 4b, if the subscriber identity module card in the transaction illustrated by the figure is a so-called prepaid card, no debiting will have to be done from the server 10. Instead, money is first loaded into the module SIM, e.g., using an SMS message, block 31. The procedure continues by first reading into the subscriber identity module SIM the sum to be debited, block 32, and then debiting the customer by decreasing (block 33) his/her payment tickets created beforehand on the card SIM. Finally, the seller's system J1 is informed of the remittance.

Correspondingly, in a third example, represented by the flow diagram in FIG. 4c and relating to access control, the signaling is based on the use of a GSM network as a physical transmission link by making use of short messages, such as SMS or USSD messages to transmit information. The user requests access by sending either an SMS, USSD or other short message, block 41. To be able to make the request, the subscriber identity module card SIM must contain an application that knows how to ask both the user and the server for the right things. In GSM cards, this could be implemented using an Application Toolkit consistent with the GSM standards. The server must perform the required actions to allow or deny access and, if necessary, to debit the user for the permission, in which case the user's creditworthiness must be verified or tickets decreased on a prepaid card. As in the previous example, in this case, too, the server receives information indicating that a response to the message is expected. An external reader verifies the user's right of access by asking the subscriber identity card about the right of access. If the card has the right of access, the reader will indicate this by giving a sound signal or by opening the door. In the case of a card with a right of access granted for a certain period, the right can be removed from the card by sending a new SMS, USSD or other short message and deleting the field indicating right of access.

Another arrangement for verifying the right of access of the card is that the information regarding right of access is located in the reader instead of on the card, and a server 10 in the transmission network sends the reader J1 information regarding the right of access of each card at certain intervals. In this case, the reader J1 only asks the card SIM for an identification number, block 42, and compares it with its own data to decide about the user's right of access, block 43. In the case of rights granted for a certain period, the right of access expires when the card number is no longer updated in the reader as an allowed number entitled to access. In the case of the solution described, the server could be provided with a timer whose triggering would result in removing outdated card numbers indicating right of access.

To sum up, let it be stated that in practice the actions described above are realized by briefly exposing a telephone to a remote reader and verifying the transaction via the user interface of the telephone, whereupon the transaction is recorded in the remote reader. Depending on the nature of the transaction, either a data link is needed between the remote reader and the data system or the files in the remote reader are transferred into the data system, e.g., at the end of each day. Thus, a user having a mobile station with a suitable card in it will be able to carry out various smart card functions using only his/her telephone.

Thus, while there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A subscriber identity module (SIM), comprising a data processing device, a memory device connected to the data processing device, a first data transfer device which is connected to the data processing device and provided with a first interface (RP1) for data transfer between a mobile station (MS) and the subscriber identity module that is implemented in a subscriber identity module (SIM) card, and a second data transfer device which is connected to the data processing device and provided with a second interface (RP2) over which a data transfer connection to a device and/or application other than a mobile station is set up, the first and second interfaces being contemporaneously available for use when the subscriber identity mobile is connected to the mobile station while the mobile station is in operation.

2. A subscriber identity module as defined in claim 1, wherein the subscriber identity module (SIM) comprises a reading and writing device connected to the data processing device via the second data transfer device.

3. A subscriber identity module as defined in claim 2, wherein the reading and writing device is a remote device.

4. A subscriber identity module as defined in claim 2, wherein the reading and writing device is an infrared device.

5. A mobile station comprising a subscriber identity module that comprises a data processing device, a memory device connected to the data processing device, a first data transfer device which is connected to the data processing device and provided with a first interface for data transfer between the mobile station (MS) and the subscriber identity module, and a second data transfer device which is connected to the data processing device and provided with a second interface, a data transfer connection being set up over the second interface to a device and/or application other than a mobile station, the first and second interfaces being contemporaneously available for use when the subscriber identity mobile is connected to the mobile station while the mobile station is in operation.

6. A mobile station as defined in claim 5, wherein the subscriber identity module (SIM) comprises a reading and writing device connected to the data processing device via the second data transfer device.

7. A mobile station as defined in claim 6, wherein the reading and writing device is a remote device.

8. A mobile station as defined in claim 6, wherein the reading and writing device is an infrared device.

9. A mobile station comprising a subscriber identity module and a remote device, wherein the subscriber identity module comprises a data processing device, a memory device connected to the data processing device, a first data transfer device which is connected to the data processing device and provided with a first interface (RP1) for data transfer between the mobile station (MS) and the subscriber identity module, and a second data transfer device which is connected to the data processing device and provided with a second interface (RP2), a data transfer connection being set up over a second interface to a device and/or application other than a mobile station, and wherein the remote device is connected over a third interface (RP3) to the subscriber identity module (SIM).

10. A method for performing a smart card function using a mobile station comprising the subscriber identity module that comprises a data processing device, a memory device connected to the data processing device, a first data transfer device which is connected to the data processing device and provided with a first interface for data transfer between the mobile station (MS) and the subscriber identity module, and a second data transfer device which is connected to the data processing device and provided with a second interface, a data transfer connection being set up over a second interface to a device and/or application other than a mobile station, the method comprising the steps of:

establishing a connection between the subscriber identity module and a first external system;

requesting from the subscriber identity module that the user give approval via the first external system for the execution of the smart card function, wherein predetermined information for the smart card function is stored in the subscriber identity module and the information is updated based on the smart card function under the control of the first system; and informing the first external system of the user's approval.

11. A method as defined in claim 10, further comprising requesting second external system to give its approval for the execution of the smart card function.

12. A method as defined in claim 11, wherin the connection to the second external system is established via a mobile communication network.

13. A method as defined in claim 12, wherein short messages, preferably SMS and/or USSD messages, and/or other message transmission methods defined in the GSM standard are used for the transmission of information in the mobile communication network.

* * * * *